(12) United States Patent
Kochiya

(10) Patent No.: US 6,799,245 B1
(45) Date of Patent: *Sep. 28, 2004

(54) RAID APPARATUS STORING A PLURALITY OF SOME LOGICAL VOLUMES ON DIFFERENT DISK UNITS

(75) Inventor: Toshiaki Kochiya, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,346

(22) Filed: Jul. 31, 1997

(30) Foreign Application Priority Data

Nov. 1, 1996 (JP) .............................................. 8-291692

(51) Int. Cl.[7] .............................................. G06F 12/16
(52) U.S. Cl. .......................................... 711/114; 714/6
(58) Field of Search ................................ 711/114, 173; 714/6, 7

(56) References Cited

U.S. PATENT DOCUMENTS

| | | | | |
|---|---|---|---|---|
| 4,974,156 A | * | 11/1990 | Harding et al. | 711/162 |
| 5,568,629 A | * | 10/1996 | Gentry et al. | 711/114 |
| 5,636,356 A | * | 6/1997 | Kakuta et al. | 711/114 |
| 5,708,668 A | * | 1/1998 | Styczinski | 711/114 |
| 5,708,769 A | * | 1/1998 | Stallmo | 714/6 |
| 5,819,310 A | * | 10/1998 | Vishlitzky et al. | 711/114 |
| 5,918,000 A | * | 6/1999 | Yamashita et al. | 714/7 |
| 5,954,822 A | | 9/1999 | Yashiro et al. | |

FOREIGN PATENT DOCUMENTS

| | | |
|---|---|---|
| EP | 0 697 660 A1 | 2/1996 |
| JP | 5-108274 | 4/1993 |
| JP | 6-266510 | 9/1994 |
| JP | 8-063298 | 3/1996 |
| JP | 8-286842 | 11/1996 |

OTHER PUBLICATIONS

Prior Art Information List, including Concise Explanation of Relevance of each cited reference.
Office Action mailed Dec. 4, 2001 in counterpart Japanese application (3 pages) and Partial English Translation of Relevant Portion (Examiner's Statements, 2 pages).
Leana Golubchik et al.; *Chained Declustering: Load Balancing and Robustness to Skew and Failures*; 2nd Int Wkshp on Research Issues on Data Engineering: Transaction and Query Processing; 1992 IEEE, pp. 88–95.
European Search Report dated Jul. 24, 2000 for corresponding European Application No. EP 97 11 4090.
*The RAIDBOOK*, A Source Book for RAID Technology, Edition 1–1, published by The RSID Adivsory Board, St. Peter, MN, Nov. 18, 1993, pp. 1–110.

* cited by examiner

*Primary Examiner*—Gary Portka
(74) *Attorney, Agent, or Firm*—Staas & Halsey LLP

(57) ABSTRACT

A RAID apparatus includes having a plurality of same logical volumes allocated on a real volume. The real volume is so designed that a plurality of same logical volumes are respectively allocated on different physical disk units and a combination of a plurality of logical volumes allocated on each physical disk unit differs from one physical disk unit to another. This structure prevents uneven loading on the real volume from occurring due to uneven loads on the logical volumes.

7 Claims, 19 Drawing Sheets

FIG. 3
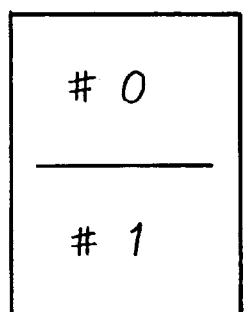
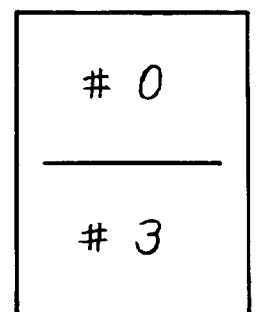
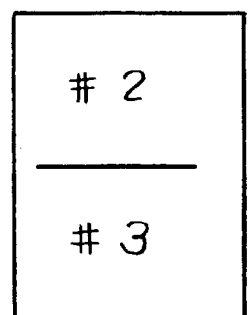
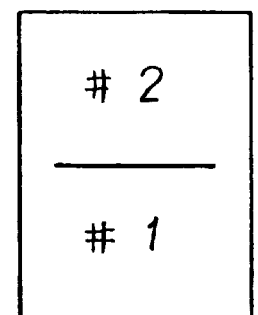

FIG. 8A

| Logical Volume #0 | Real Volume Number | -------- | Real Volume Number | Counter |
|---|---|---|---|---|
| ⋮ | ⋮ | ⋮ | ⋮ | ⋮ |
| Logical Volume #3 | Real Volume Number | -------- | Real Volume Number | Counter |

| Real Volume 1 | In Use Flag |
|---|---|
| ⋮ | ⋮ |
| Real Volume 4 | In Use Flag |

22-2

RAID APPARATUS STORING A PLURALITY OF SOME LOGICAL VOLUMES ON DIFFERENT DISK UNITS

BACKGROUND OF THE INVENTION

1. Field of the Invention

The present invention relates to a RAID (Redundant Arrays of Inexpensive Disks) apparatus which allocates a plurality of same logical volumes to a real volume consisting of a plurality of physical disk units, and, more particularly, to a RAID apparatus which efficiently uses physical disk units with a plurality of logical volumes.

2. Description of the Related Art

Disk systems like a magnetic disk system are used as an external storage system in a computer system. A host computer accesses such a disk system with a logical volume name that an OS (Operating System) recognizes. Logical volumes, which are units of disk devices the host computer recognizes, are allocated in a disk system.

If each logical volume is allocated just one in such a disk system, when a physical disk unit where that logical volume is located fails, the logical volume cannot be used any more.

To prevent this shortcoming, a RAID apparatus has been proposed. A RAID apparatus has a plurality of same logical volumes allocated on different disk units. Even when one disk unit fails, another disk unit where the same logical volume is allocated can be used to access that logical volume.

FIG. 17 is a structural diagram of prior art. As shown in FIG. 17, a RAID apparatus comprises a plurality of magnetic disk units 91-1 to 91-4 and a disk controller 90 which controls those disk units. The capacity of each of the magnetic disk units 91-1 to 91-4 has been increased drastically. There is a limit to the capacity of a volume that an OS recognizes. For instance, while a single magnetic disk unit has a capacity of 9 gigabytes, a volume recognizable by an OS is a maximum of about 4.5 gigabytes.

In this respect, each of the magnetic disk units (real volumes) 91-1 to 91-4 is divided to volumes recognizable by an OS (which are called "logical volumes").

The conventional scheme of combining logical volumes on the real volumes 91-1 to 91-4 was to make the combination of logical volumes on each real volume identical to the combination of logical volumes on another associated real volume.

As shown in FIG. 17, for example, the mirror structure of RAID-1 allocates two different logical volumes to each of the four magnetic disk units 91-1 to 91-4. Specifically, logical volumes #0 and #1 are allocated on the magnetic disk units 91-1 and 91-2, and logical volumes #2 and #3 on the magnetic disk units 91-3 and 914. This scheme maintains the contents of two real volumes identical to each other.

FIGS. 18A, 18B and 19 are diagrams for explaining the problems of the prior art. The loads on the individual logical volumes differ from one another depending on the properties of the logical volumes. Suppose that the numbers of accesses to the logical volumes #0, #1, #2 and #3 are 80 times, 60 times, 40 times and 20 times, respectively. FIG. 18A shows the corresponding numbers of accesses to the physical disk units in the conventional allocation of the logical volumes. Since the logical volumes #0 and #1 are allocated on the physical disk unit 91-1, the number of accesses becomes 70 times. Likewise, as the logical volumes #0 and #1 are also allocated on the physical disk unit 91-2, the number of accesses becomes 70 times. Because the logical volumes #2 and #3 are allocated on the physical disk unit 91-3, the number of accesses becomes 30 times. Likewise, as the logical volumes #2 and #3 are also allocated on the physical disk unit 91-4, the number of accesses becomes 30 times.

That is, uneven loads on the logical volumes directly result in uneven loads on the real volumes. For example, the loads on the physical disk units 91-1 and 91-2 where the logical volumes #0 and #1 are allocated become greater, while the loads on the physical disk units 91-3 and 91-4 where the logical volumes #2 and #3 are allocated become smaller.

Therefore, uneven loads on the logical volumes lead to uneven loads on the physical disk units. This causes a problem of increasing the chance of high-load physical disk units being busy, thus reducing the overall access speed.

In some cases, sequential copy may be made between logical volumes. For example, copying from the logical volume #0 to the logical volume #1 may be made as shown in FIG. 18B. In this example, contention to the physical disk unit 91-1 occurs when copying is done from the logical volume #0 of the physical disk unit 91-1 to the logical volume #1 of the physical disk unit 91-1.

Likewise, when copying is done from the logical volume #0 of the physical disk unit 91-2 to the logical volume #1 of the physical disk unit 91-1, access to the logical volume #1 of the physical disk unit 91-2 contends the copying operation. If sequential copy is made between logical volumes, therefore, the performance is considerably reduced.

Further, a physical disk unit may be damaged so that it should be in retreat mode. Suppose that the physical disk unit 91-1 fails as shown in FIG. 19. According to the prior art, the logical volumes allocated on the physical disk unit 91-1 are also allocated on the physical disk unit 91-2, so that loads will be concentrated on the physical disk unit 91-2.

If the access numbers of the individual logical volumes are as exemplified in FIG. 18A, with the physical disk unit 91-1 failing, the access numbers of the physical disk units 91-3 and 91-4 do not change, while the access number of the physical disk unit 91-2 alone increases, as shown in FIG. 19.

In retreat mode, therefore, loads are undesirably concentrated on the physical disk unit where the same logical volumes allocated on the failing physical disk unit are allocated, thus lowering the performance.

SUMMARY OF THE INVENTION

Accordingly, it is an object of the present invention to provide a RAID apparatus which prevents loads from being imparted on real volumes due to uneven loads on logical volumes.

It is another object of this invention to provide a RAID apparatus which auto-adjusts loads between real volumes.

It is a further object of this invention to provide a RAID apparatus which prevents the performance from being reduced by uneven loads on logical volumes.

A RAID apparatus according to this invention comprises a real volume including a plurality of physical disk units on each of which a plurality of different logical volumes are allocated, and a disk controller for accessing any physical disk unit where a designated logical volume is allocated in order to access the designated logical volume.

The real volume is designed in such a manner that a plurality of same logical volumes are respectively allocated on different physical disk units and a combination of a plurality of logical volumes allocated on each physical disk unit differs from one physical disk unit to another.

As apparent from the above, the combination of logical volumes to be allocated differs from one physical disk unit to another. Even if loads are not evenly imparted on the logical volumes, therefore, loading on the physical disk units is adjusted because of the difference in the combinations of the logical volumes to be allocated between the physical disk units. It is thus possible to prevent uneven loading on the physical disk units from occurring due to uneven loads on the logical volumes.

In a process of making a copy from one logical volume to another, it is possible to prevent contention of access to logical volumes which are undergoing the copying process, due to the difference in the combinations of the logical volumes to be allocated between the physical disk units.

Even in retreat mode, loads are distributed to the whole physical disk units to prevent over-concentration of loads for the combination of the logical volumes to be allocated on each physical disk unit differs from one physical disk unit to another.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

FIG. 3 is an explanatory diagram of a disk unit according to the embodiment in FIG. 2;

FIGS. 8A and 8B are structural diagrams of the converting mechanism in FIG. 7;

DETAILED DESCRIPTION OF THE PREFERRED EMBODIMENTS

Figure 1:
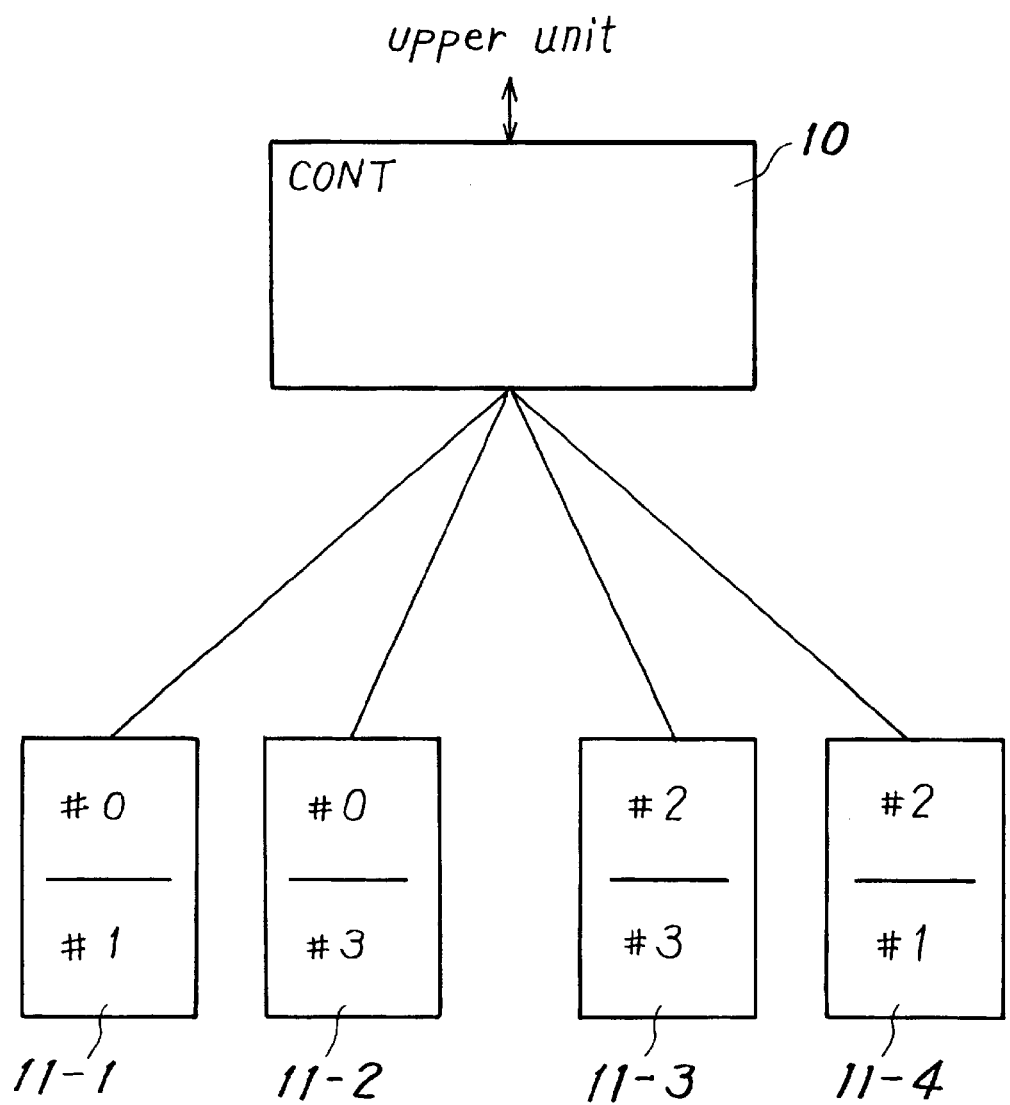
FIG. 1 is a principle diagram of this invention.

FIG. 1 presents a principle diagram of this invention.

As shown in FIG. 1, real volumes have a plurality of physical disk units 11-1 to 11-4 on which a plurality of different logical volumes are allocated. A disk controller 10 accesses any of the physical disk units 11-1 to 11-4 where a designated logical volume is allocated, in order to access this designated logical volume.

A plurality of same logical volumes are respectively allocated on different physical disk units. Further, the combination of a plurality of logical volumes allocated on each physical disk unit is made different from one physical disk unit to another.

For example, logical volumes #0 and #1 are allocated on the physical disk unit 11-1. Logical volumes #0 and #3 are allocated on the physical disk unit 11-2. Logical volumes #2 and #3 are allocated on the physical disk unit 11-3. Logical volumes #2 and #1 are allocated on the physical disk unit 11-4. The real volume is therefore designed in such a way that the combination of a plurality of logical volumes allocated on each physical disk unit differs from one physical disk unit to another.

Figure 2:
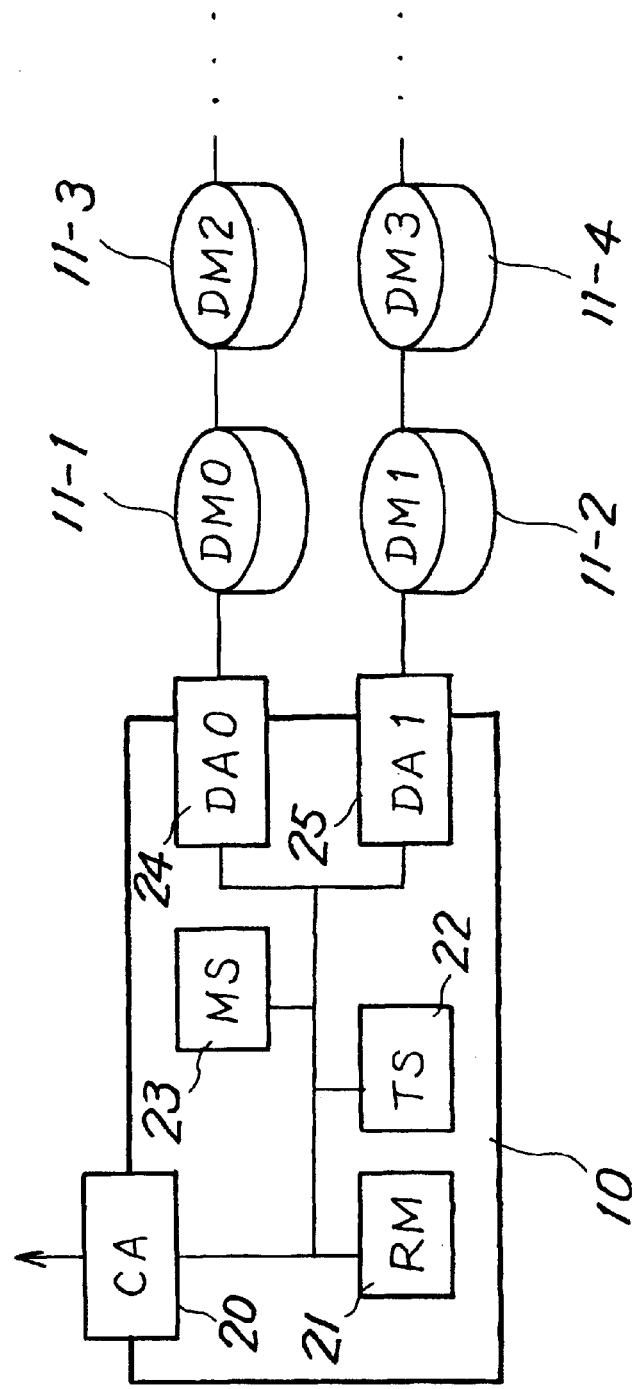
FIG. 2 is a structural diagram of one embodiment of this invention.
Figure 4:
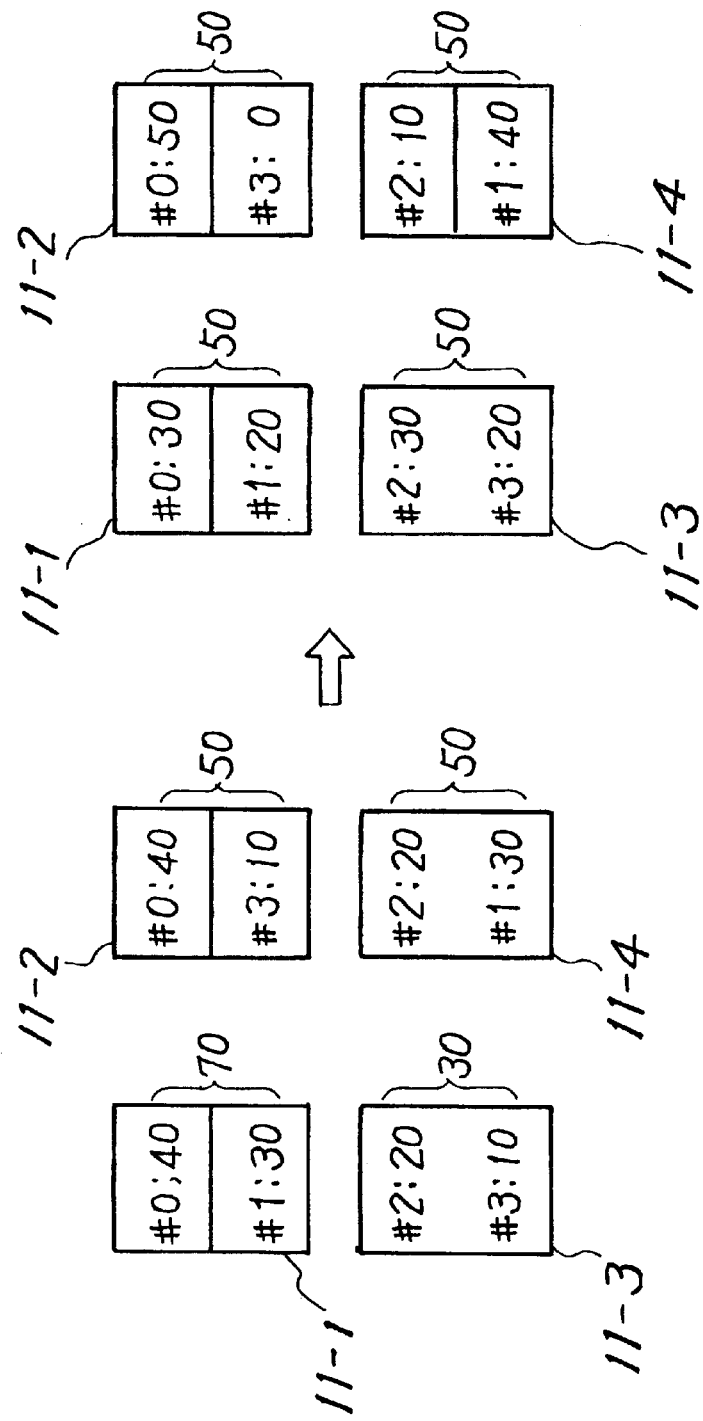
FIG. 4 is an explanatory diagram of an automatic load adjusting operation according to the embodiment in FIG. 2.
Figure 5:
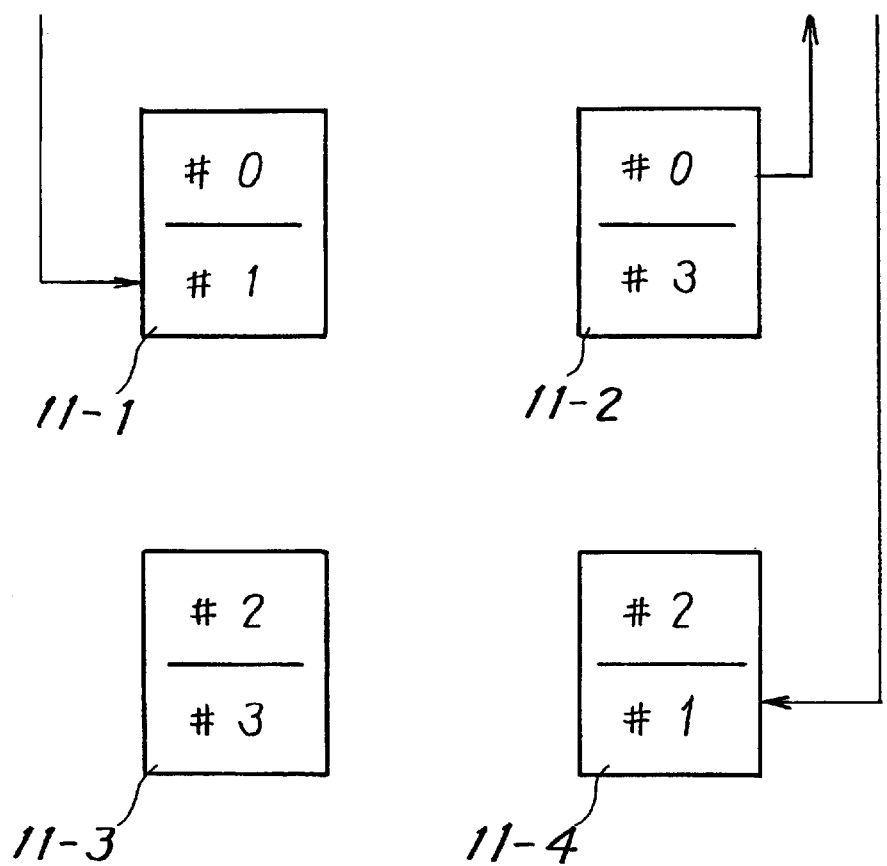
FIG. 5 is an explanatory diagram of the operation of the embodiment in FIG. 2 at the time copying is performed.
Figure 6:
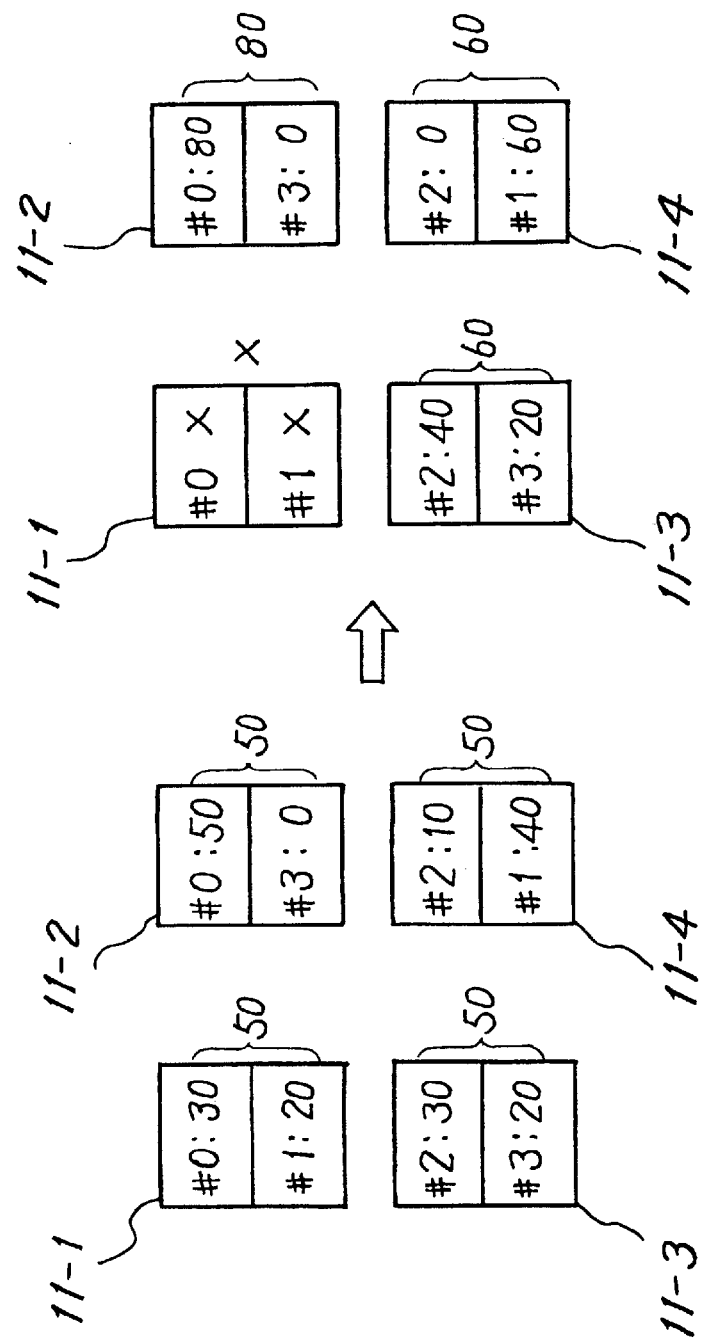
FIG. 6 is an explanatory diagram of the operation of the embodiment in FIG. 2 in retreat mode.

FIG. 2 is a structural diagram of one embodiment of this invention, FIG. 3 is an explanatory diagram of a disk unit according to this embodiment, FIG. 4 is an explanatory diagram of an automatic load adjusting operation in FIG. 3, FIG. 5 is an explanatory operational diagram at the time copying with the disk unit in FIG. 3 is performed, and FIG. 6 is an explanatory diagram of the operation of the disk unit in FIG. 3 in retreat mode.

Referring to FIG. 2, the disk controller 10 is constituted of a magnetic disk controller. The disk controller 10 has a channel adapter 20 for exchanging commands/data with a high-rank apparatus like a computer, a resource manager 21 for managing resources, a table storage 22 for storing various kinds of tables, a main storage 23 for storing read/write data, etc., and two device adapters 24 and 25 for controlling the devices (magnetic disk units) 11-1 to 11-4.

The magnetic disk units 11-1 to 11-4, each constituted of a known magnetic disk storage device, are connected to the associated device adapters 24 and 25.

In the magnetic disk units 11-1 to 11-4, logical volumes are allocated as shown in FIG. 3. The following description will given of the case where the RAID structure is the mirror structure of RAID-1. The mirror structure has each of the logical volumes #0 to #3 allocated twice. That is, the same logical volume is allocated twice.

In this example, it is assumed that two logical volumes are allocated on each of the magnetic disk units 11-1 to 11-4. The logical volumes #0 and #1 are allocated on the magnetic disk unit 11-1. The logical volumes #0 and #3 are allocated on the magnetic disk unit 11-2. The logical volumes #2 and #3 are allocated on the magnetic disk unit 11-3. The logical volumes #2 and #1 are allocated on the magnetic disk unit 11-4.

Therefore, the same logical volume is allocated on different magnetic disk units, and the combination of logical volumes allocated on each magnetic disk unit differs from one magnetic disk unit to another.

The operation of a system which has logical volumes allocated in asymmetrical fashion will now be described.

Suppose that the numbers of accesses to the logical volumes #0, #1, #2 and #3 are 80 times, 60 times, 40 times and 20 times, respectively, as shown in FIG. 4. Since the logical volumes #0 and #1 are allocated on the magnetic disk unit 11-1 in the asymmetrical allocation, the access number becomes 70 times, as shown on the lefthand side in FIG. 4. Likewise, as the logical volumes #0 and #3 are also allocated on the magnetic disk unit 11-2, the access number becomes 50 times.

Because the logical volumes #2 and #3 are allocated on the magnetic disk unit 11-3, the access number becomes 30 times. Likewise, as the logical volumes #2 and #1 are also allocated on the magnetic disk unit 11-4, the access number becomes 50 times.

In the normal operation, to access a logical volume, a magnetic disk unit which is not in use is accessed. As the access operation proceeds, therefore, the loads are gradually adjusted to the state shown on the right-hand side in FIG. 4.

The logical volumes #1 and #3 which are respectively allocated on the magnetic disk units 11-1 and 11-2 which both include the logical volume #0 have their pairs in the magnetic disk units 11-3 and 11-4 which do not include the logical volume #0. The frequency of processing on the logical volumes #1 and #3 (the read requesting process) performed on the magnetic disk units 11-3 and 11-4 which do not include the logical volume #0 that has a relatively low load increases.

The adjustment of the loads is executed in a chain-like fashion. At last, load adjustment is performed over the entire magnetic disk units 11-1 to 11-4 in the group. Accordingly, the high load on the magnetic disk unit 11-1 is distributed to the magnetic disk units 11-2, 11-3 and 11-4 which have low loads.

The access numbers to the individual magnetic disk units 11-1 to 11-4 all become equal to 50 times. Even if there are uneven loads on the logical volumes, therefore, the loads on the magnetic disk units become even. Even if there are uneven loads on the logical volumes, thus, the response speeds of the individual magnetic disk units become identical.

This can shorten the standby time for access to even a high-load logical volume. That is, the access speed of the disk system having a mirror structure can be improved.

FIG. 5 illustrates the operation of copying from the logical volume #0 to the logical volume #1. In this example, the logical volume #0 on the magnetic disk unit 11-2 is copied on the logical volume #1 on the magnetic disk unit 11-1.

In this case, even when there is an access to the logical volume #1, this logical volume #1 is allocated on the magnetic disk unit 11-4 which is free, so that the logical volume #1 can be accessed by accessing the magnetic disk unit 11-4.

The same is true of copying between other logical volumes. As access contention to the logical volumes can be avoided even when copying between the logical volumes is in progress, the response performance is improved.

FIG. 6 is an explanatory diagram of the operation in retreat mode. The left-hand state in FIG. 6 shows the state after the adjustment shown on the right-hand side in FIG. 4. When one magnetic disk unit 11-1 fails in this case, the other magnetic disk units 11-2 to 11-4 are used.

In this case, the load on the failing magnetic disk unit 11-1 is distributed to the magnetic disk units 11-2 to 11-4 which are not malfunctioning. The access number to the magnetic disk unit 11-2 is 80 times, the access number to the magnetic disk unit 11-3 is 60 times, and the access number to the magnetic disk unit 11-4 is 60 times.

In general, in retreat mode where one of each pair of magnetic disk units in the mirror structure fails and cannot be used, the performance of the read requesting process becomes halved according to the conventional structure. According to this invention, by contrast, the performance of the read requesting process would be reduced merely by 25% due to the load distribution.

Note that the logical volumes #0 to #3 are located at the same positions on the magnetic disk units 11-1 to 11-4, as shown in FIG. 3. For instance, the logical volume #1 is located on the lower side of the magnetic disk units 11-1 and 11-4.

In the block indicating each magnetic disk unit in this diagram, the upper side is the outer peripheral side of a magnetic disk and the lower side is the inner peripheral side of the magnetic disk. In other words, the logical volume #1 is allocated on the inner peripheral side on the magnetic disk units 11-1 and 11-4.

A description will now be given of the reason why a plurality of same logical volumes are allocated on the magnetic disk units at the same position. A magnetic disk unit has different amounts of data per track between the inner peripheral side and the outer peripheral side. The amount of data to be read/written per track or per unit time is greater on the outer peripheral side. This means that the closer to the outer periphery of the magnetic disk the access point is located, the faster the read/write time per data becomes.

With the use of the mirror structure, writing is simultaneously performed on a pair of logical volumes. If the locations of the logical volumes vary on the magnetic disks, therefore, the write time varies. It is necessary to tune the writing operation to the one having a slower writing speed, which deteriorates the overall performance.

When a plurality of same logical volumes are allocated on magnetic disks at the same position, on the other hand, the write time becomes the same between those same logical volumes. The read/write time in the mirror structure is thus improved.

Figure 7:
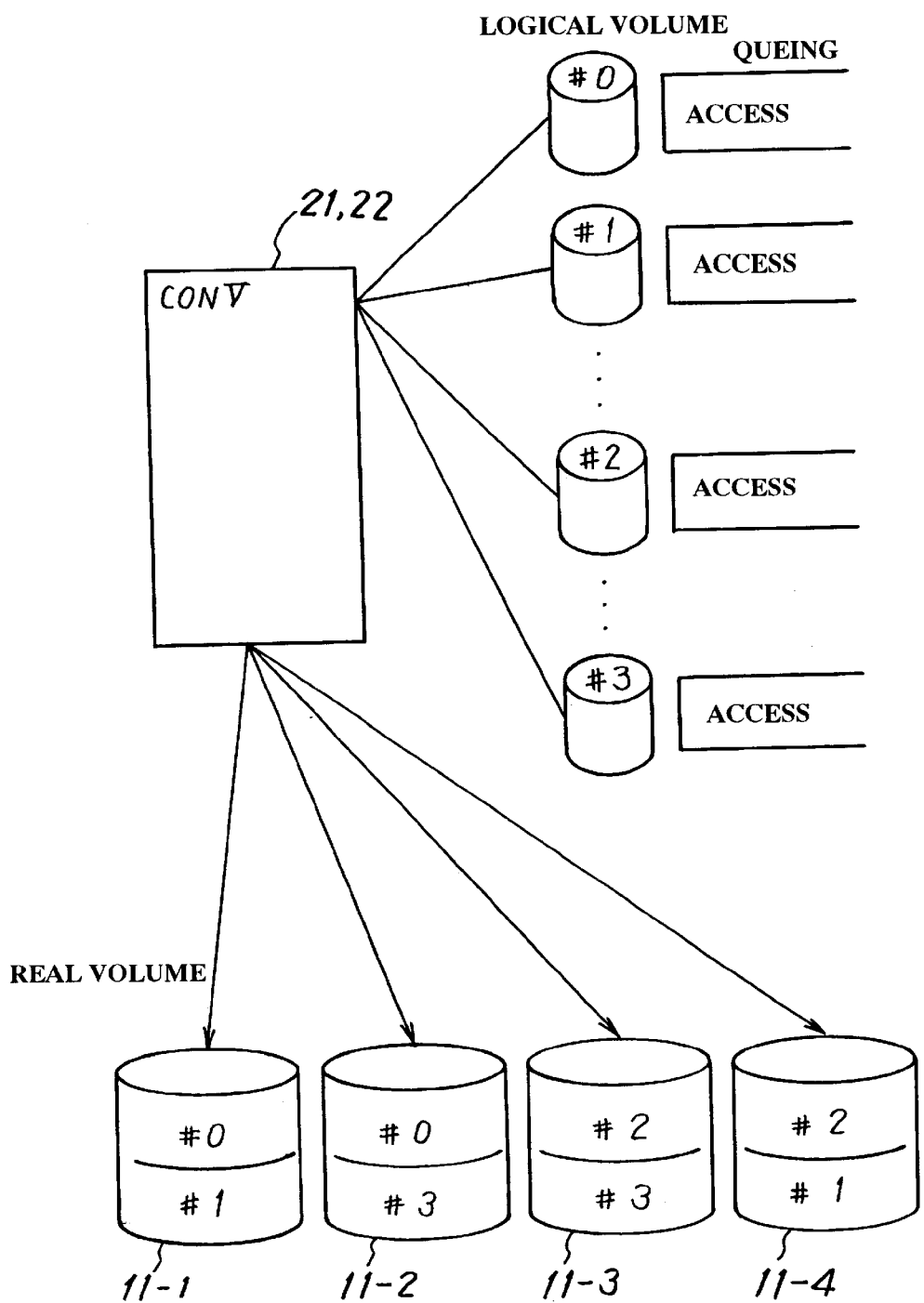
FIG. 7 is an explanatory diagram of a converting mechanism according to the embodiment in FIG. 2.

The structure and operation will be discussed more specifically. FIG. 7 is an explanatory diagram of a converting mechanism between logical volumes in FIG. 2, and FIGS. 8A and 8B are structural diagrams of the converting mechanism in FIG. 7.

As shown in FIG. 7, queued accesses to the individual logical volumes #0 to #3 are converted to accesses to the magnetic disk units (real volumes) 11-1 to 11-4 by the resource manager 21 and the table storage 22.

Provided in the table storage 22 are a conversion table 22-1 shown in FIG. 8A and a use-state table 22-2 shown in FIG. 8B.

The conversion table 22-1 stores, for each of the logical volumes #0–#3, the number of the real volume (magnetic disk unit) where the associated logical volume is allocated. For each logical volume, the conversion table 22-1 further stores a counter representing the multiplicity that indicates the quantity of that logical volume.

In the example in FIG. 3, for instance, the numbers of the magnetic disk units 11-1 and 11-2 are set as the numbers of the real volumes with respect to the logical volume #0. As two logical volumes #0 are allocated, the counter becomes "2."

For a failing real volume or a real volume which does not exist, an invalid flag is set in the associated column of the real volume number.

The use-state table 22-2 indicates whether or not each real volume (magnetic disk unit) is in use, by means of a use flag as shown in FIG. 8B.

Figure 9:
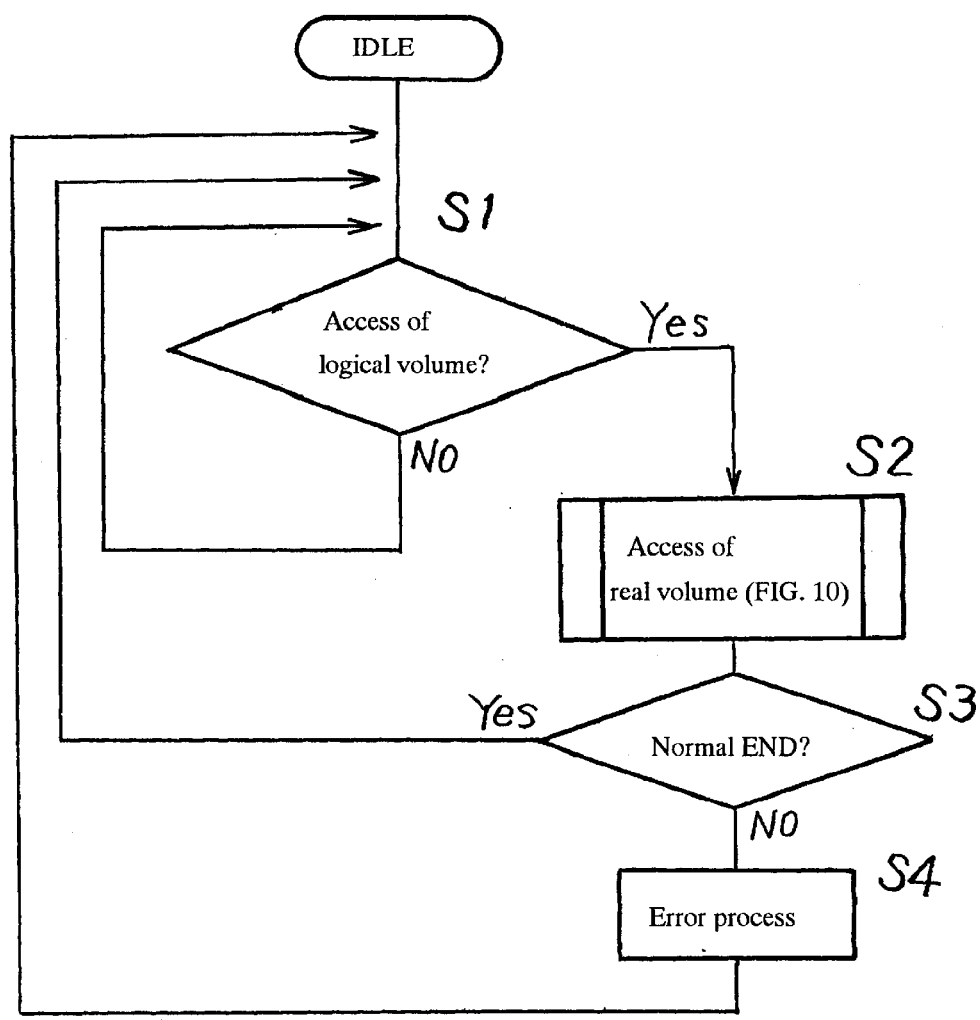
FIG. 9 is a flowchart illustrating an access process by the structure in FIG. 7.
Figure 10:
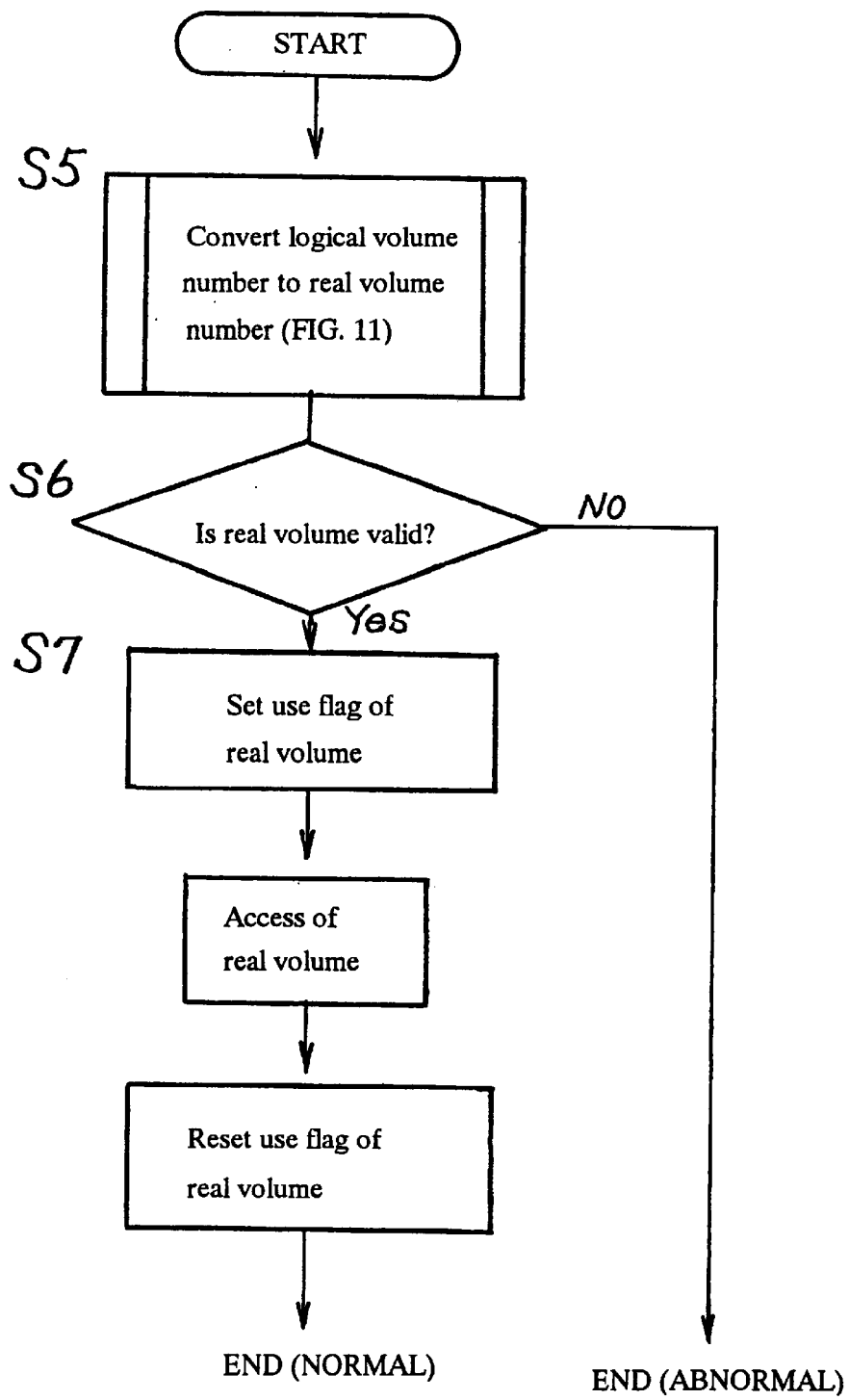
FIG. 10 is a flowchart showing a process of accessing a real volume in FIG. 9.
Figure 11:
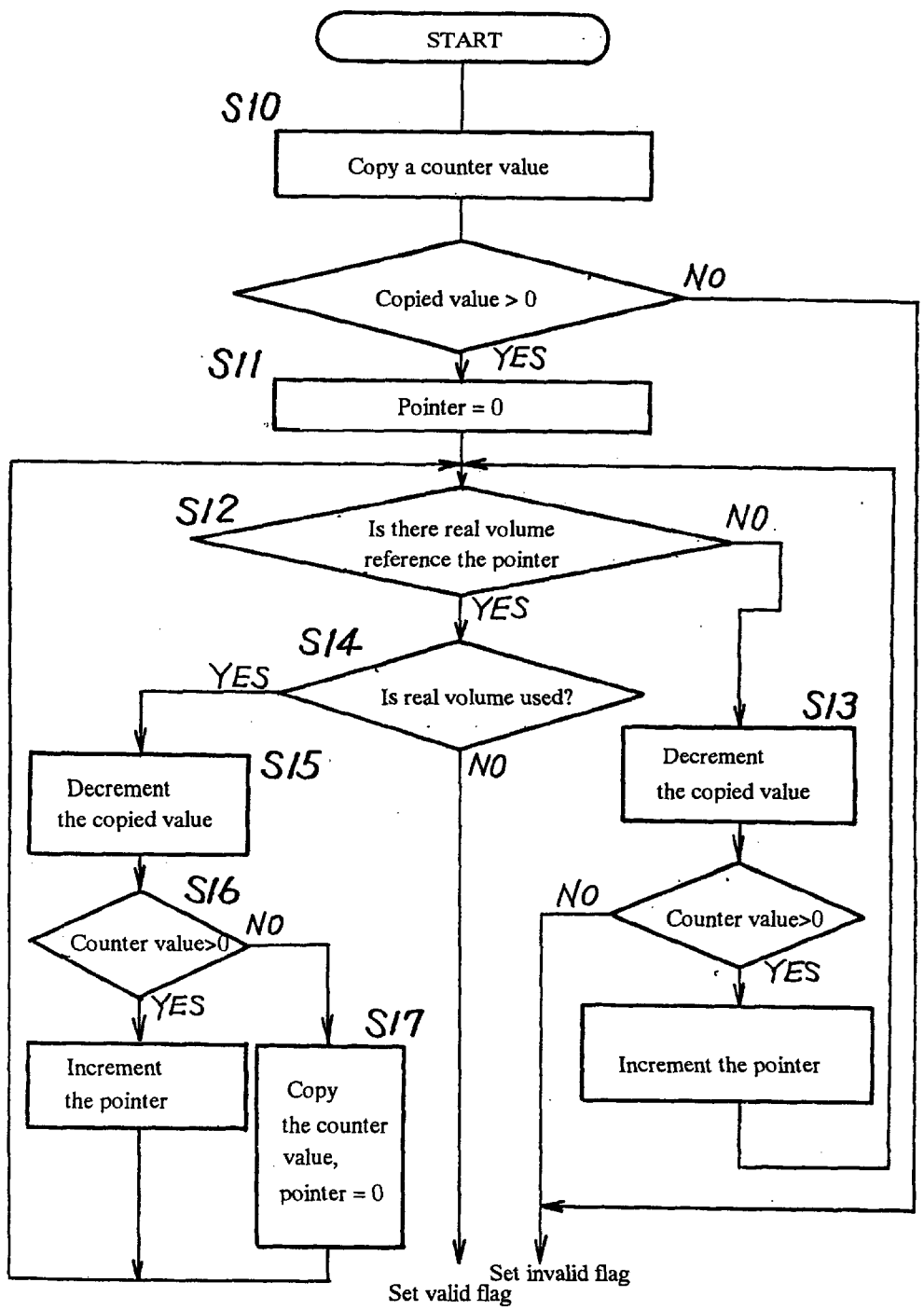
FIG. 11 is a flowchart illustrating a process of accessing a real volume number in FIG. 10.

FIG. 9 is a flowchart illustrating an access process according to the embodiment in FIG. 2, FIG. 10 is a flowchart showing a process of accessing a real volume in FIG. 9, and FIG. 11 is a flowchart illustrating a process of accessing a real volume number in FIG. 10.

The access process in FIG. 9 will be discussed below.

(S1) The resource manager 21 is constituted of a processor. The resource manager (hereinafter called "processor") 21 checks if there is an access to a logical volume by the channel adapter 20.

(S2) When determining that there is such an access, the processor 21 executes the process of accessing a real volume illustrated in FIG. 10.

(S3) The processor 21 determines if the accessing has been terminated properly. If the decision is the proper access termination, the processor 21 returns to step S1.

(S4) If the access has not been terminated properly, the processor 21 performs an error process and then returns to step S1. The process of accessing a real value in FIG. 10 will now be discussed.

(S5) When determining that there is an access, the processor 21 acquires the number of the real volume to access data from the logical volume number in the process which will be discussed later with reference to FIG. 11.

(S6) When obtaining the real volume number, the processor 21 checks if the real volume is valid. When determining that the real volume is invalid, the processor 21 sets an abnormal termination flag and returns to the routine in FIG. 9.

(S7) When determining that the real volume is valid, the processor 21 sets the use flag for this real volume in the use-state table 22-2 in the table storage 22. Then, the processor 21 accesses that real volume. That is, the processor 21 accesses the real volume (magnetic disk unit) via the device adapters 24 and 25. After the access is completed, the processor 21 erases the use flag for the real volume in the use-state table 22-2. The processor 21 further sets the normal termination flag and returns to the routine in FIG. 9.

Step S3 in FIG. 9 is for checking the normal termination flag or the abnormal termination flag to determine whether the process in FIG. 10 has been terminated normally or abnormally.

The process of accessing a real volume number in FIG. 11 will now be discussed.

(S10) The processor 21 copies the count value of the logical volume in question from the conversion table 22-1 (see FIG. 8A) in the table storage 22. The processor 21 determines if the copied count value exceeds "0." As the count value indicates the multiplicity of an allocated logical volume, the copied count value of "0" means that the logical volume has not been allocated. Unless the copied count value is greater than "0," therefore, the processor 21 sets the invalid flag indicating invalidness and then returns to the routine in FIG. 10.

(S11) When the copied count value is greater than "0," the processor 21 sets the pointer for addressing the real volume number in the conversion table 22-1 to "0."

(S12) Then, the processor 21 refers to the real volume number column in the conversion table 22-1 which is indicated by the pointer. The processor 21 checks if a real volume number is in the referred real volume number column.

(S13) When a real volume number is not present in the referred real volume number column, the processor 21 decrements the copied count value by "1." Then, the processor 21 determines if the copied count value exceeds "0." When the copied count value does not exceed "0," which means that the logical volume has not been allocated, the processor 21 sets the invalid flag indicating invalidness and then returns to the routine in FIG. 10 as done in the above-described step S10. When the copied count value is greater than "0," on the other hand, the processor 21 increments the pointer for addressing the real volume number in the conversion table 22-1 by "1" and then returns to step S12.

(S14) When determining in step S12 that the real volume indicated by the pointer exists, the processor 21 refers to the use-state table 22-2 to determine if that real volume is currently in use. When this real volume is not in use, the processor 21 sets a valid flag and returns to the routine in FIG. 10.

(S15) When determining in step S14 that the real volume is in use, the processor 21 searches for another real volume. For this purpose, the processor 21 decrements the copied count value by "1."

(S16) The processor 21 determines if this count value exceeds "0." When the copied count value exceeds "0," the processor 21 increments the pointer for addressing the real volume number in the conversion table 22-1 by "1" and then returns to step S12.

(S17) When the copied count value does not exceed "0," on the other hand, there is no further real volume on which logical volumes have been allocated. Therefore, the processor 21 recopies the count value. Then, the processor 21 sets the pointer back to "0" and then returns to step S12.

By referring to the conversion table 22-1 and the use-state table 22-2, the logical volumes are allocated and a real volume which is not being used is searched. Apparently, a real volume can easily searched by referring to those tables.

For any real volume which has become invalid, the invalid flag should be set. Even if there is an invalid real volume, searching for a free real volume can be accomplished without modifying the conversion table 22-1.

A free real volume is searched by incrementing the pointer by the multiplicity set in the counter. Therefore, the multiplicities of the individual logical volumes can be set for each logical volume as will be shortly discussed in the description of other embodiments.

An example of the allocation of logical volumes will now be discussed.

Figure 12:
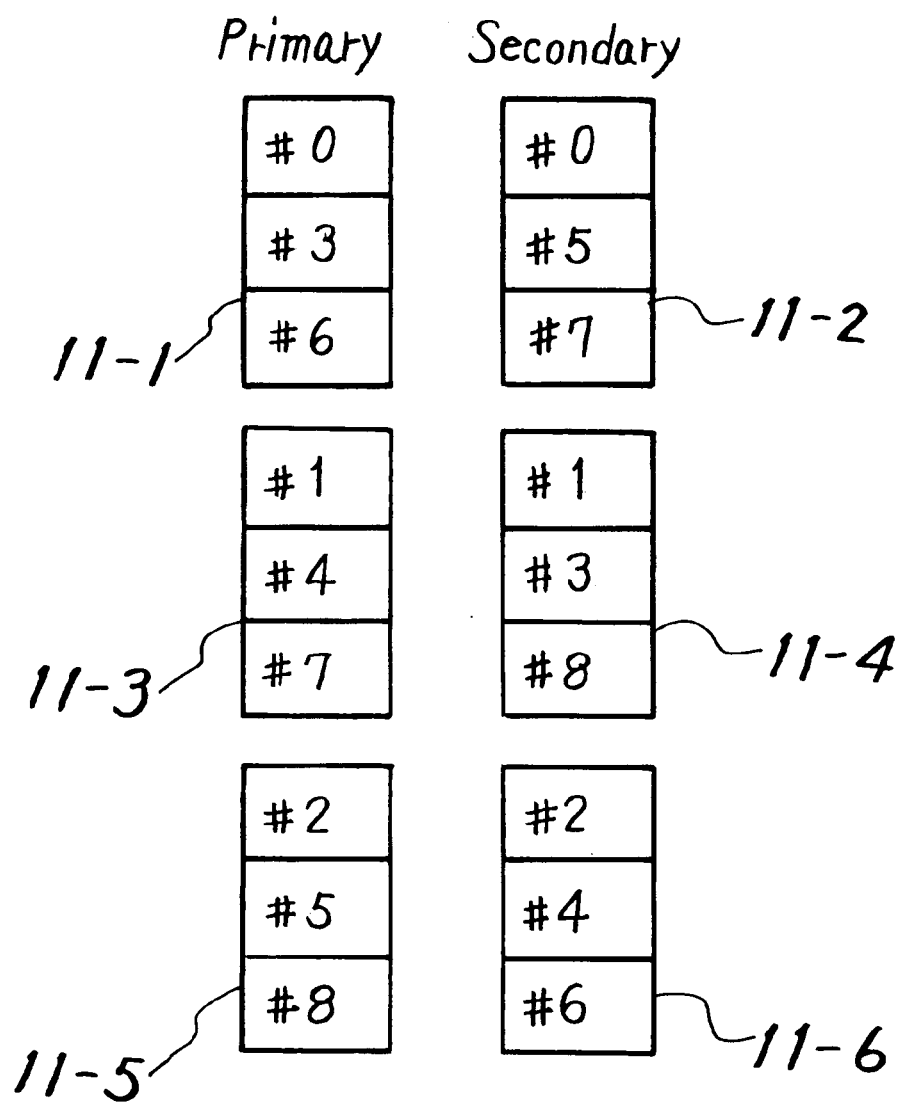
FIG. 12 is an explanatory diagram of the second embodiment of this invention.
Figure 13:
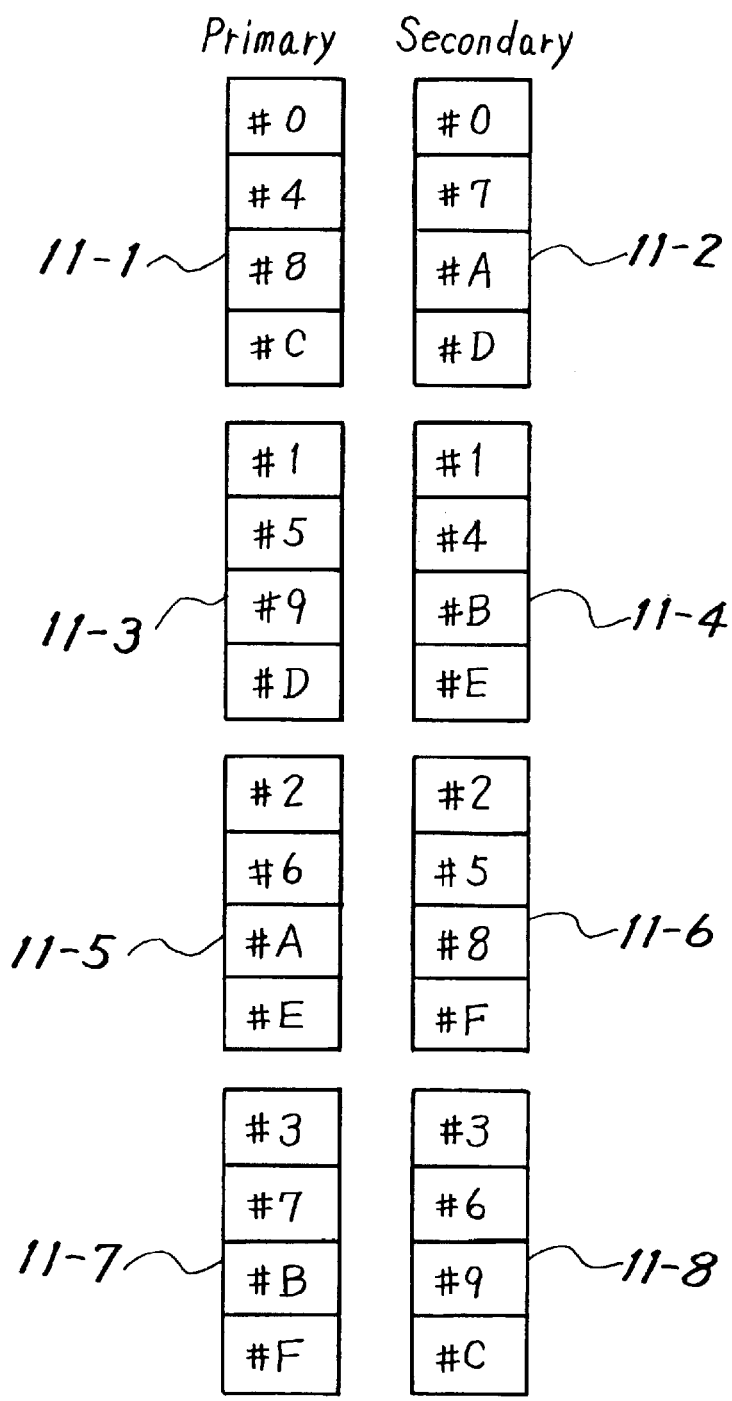
FIG. 13 is an explanatory diagram of the third embodiment of this invention.
Figure 14:
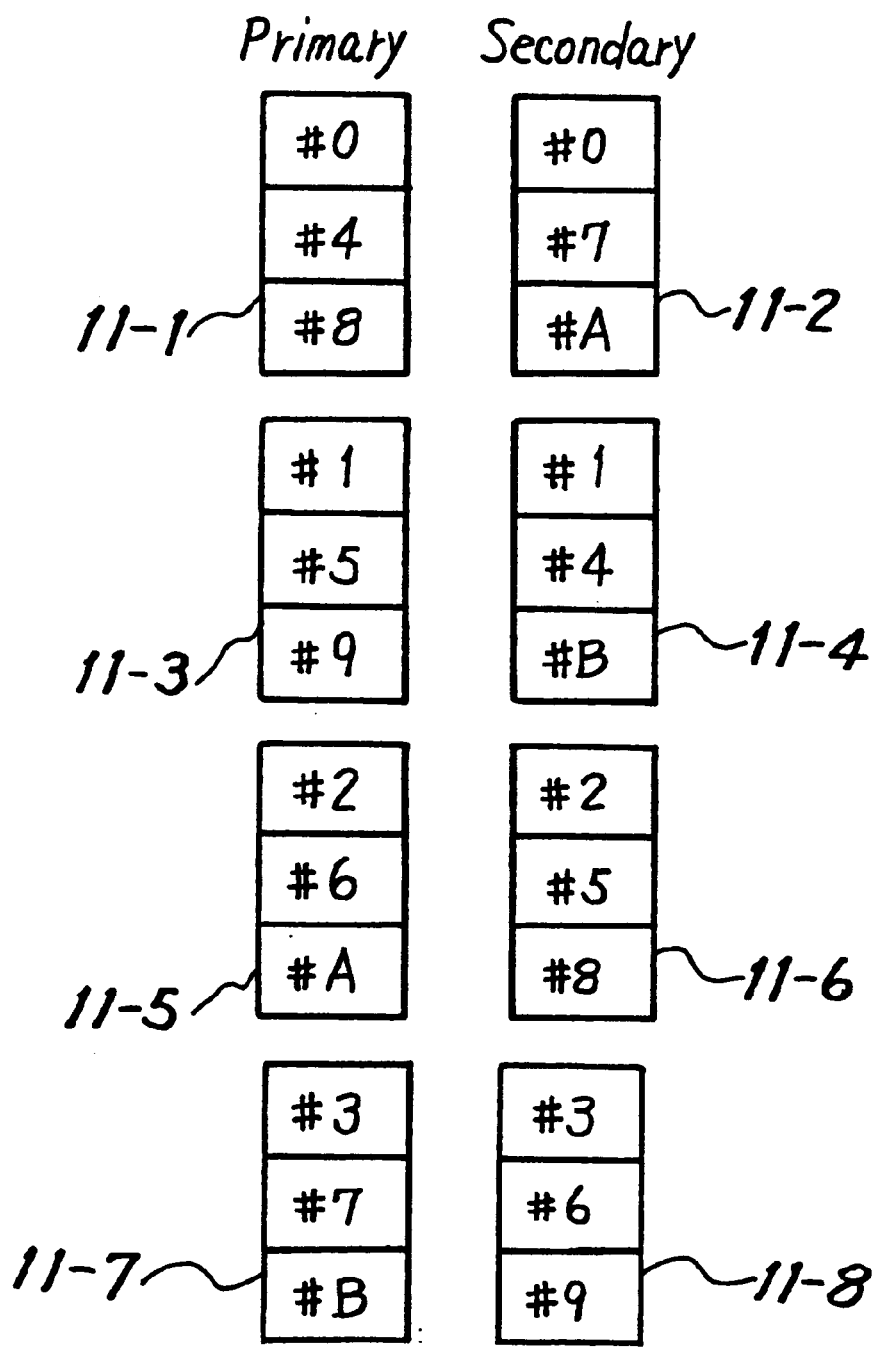
FIG. 14 is an explanatory diagram of the fourth embodiment of this invention.
Figure 15:
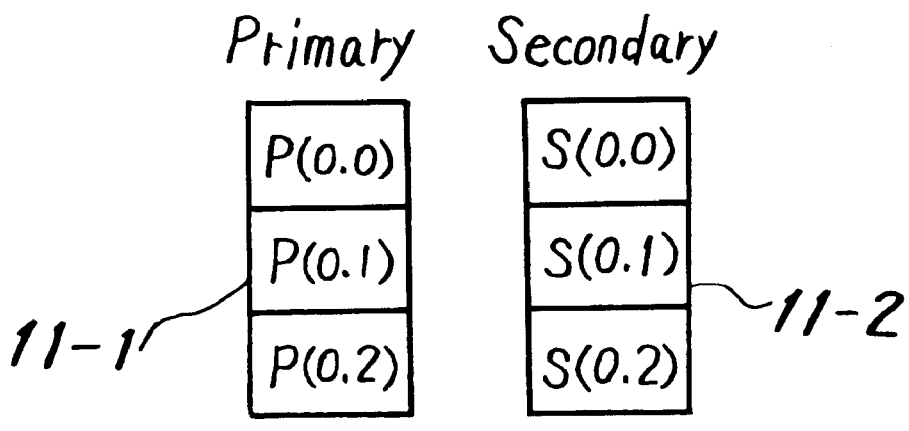
FIG. 15 is an explanatory diagram of the fifth embodiment of this invention.

FIG. 12 is an explanatory diagram of the second embodiment of this invention, FIG. 13 is an explanatory diagram of the third embodiment of this invention, FIG. 14 is an explanatory diagram of the fourth embodiment of this invention, and FIG. 15 is an explanatory diagram of the fifth embodiment of this invention.

The following description is given of the case of the mirror structure having pairs of physical disk units. Assume that m logical volumes are allocated on a single physical disk unit and the number of pairs of physical disk units is n.

FIG. 12 shows the case of m=n=3. Specifically, three logical volumes are allocated on a single physical disk unit and three pairs of physical disk units are provided in this example. As shown in FIG. 12, the combinations of logical volumes #0 to #8 allocated on the individual physical disk units 11-1 to 11-6 differ from one physical disk unit to another.

The logical volumes allocated on the same physical disk unit on the primary side are allocated different physical disk units on the secondary side. For example, the logical volumes #0, #3 and #6 allocated on the physical disk unit 11-1 are respectively allocated on the physical disk units 11-2, 11-4 and 11-6. The position of each logical volume on the physical disk unit (the inner peripheral/outer peripheral position) is the same on another physical disk unit as in the example in FIG. 3.

FIG. 13 shows the case of m=n=4. Specifically, four logical volumes are allocated on a single physical disk unit and four pairs of physical disk units are provided in this example. As shown in FIG. 13, the combinations of logical volumes #0 to #F allocated on the individual physical disk units 11-1 to 11-8 differ from one physical disk unit to another.

The logical volumes allocated on the same physical disk unit on the primary side are allocated different physical disk units on the secondary side. For example, the logical volumes #0, #4, #8 and #C allocated on the physical disk unit 11-1 are respectively allocated on the physical disk units 11-2, 11-4, 11-6 and 11-8.

The position of each logical volume on the physical disk unit (the inner peripheral/outer peripheral position) is the same on another physical disk unit as in the example in FIG. 3.

FIG. 14 shows the case of m=3 and n=4. Specifically, three logical volumes are allocated on a single physical disk unit and four pairs of physical disk units are provided in this example. As shown in FIG. 14, the combinations of logical volumes #0 to #B allocated on the individual physical disk units 11-1 to 11-8 differ from one physical disk unit to another.

The logical volumes allocated on the same physical disk unit on the primary side are allocated different physical disk units on the secondary side. For example, the logical volumes #0, #4 and #8 allocated on the physical disk unit 11-1 are respectively allocated on the physical disk units 11-2, 11-4 and 11-6.

The position of each logical volume on the physical disk unit (the inner peripheral/outer peripheral position) is the same on another physical disk unit as in the example in FIG. 3.

FIG. 15 is a diagram for explaining a general equation for the examples of the allocation of logical volumes shown in FIGS. 12 through 14.

In the figure, m is the number of logical volumes present in a single physical disk unit, and n is the number of pairs of physical disk units which constitute the mirror structure. $P(x, y)$ is the physical disk number of a logical volume y in a physical disk x which becomes the primary, and $S(x, y)$ is the physical disk number of a logical volume y in a physical disk x which becomes the secondary.

With $P(i, j)=i+n\times j$, when $i-j \geq 0$, $S(i, j)=P(i-j, j)$.

when $i-j<0$, $S(i, j)=P(n+i-j, j)$.

Figure 16:
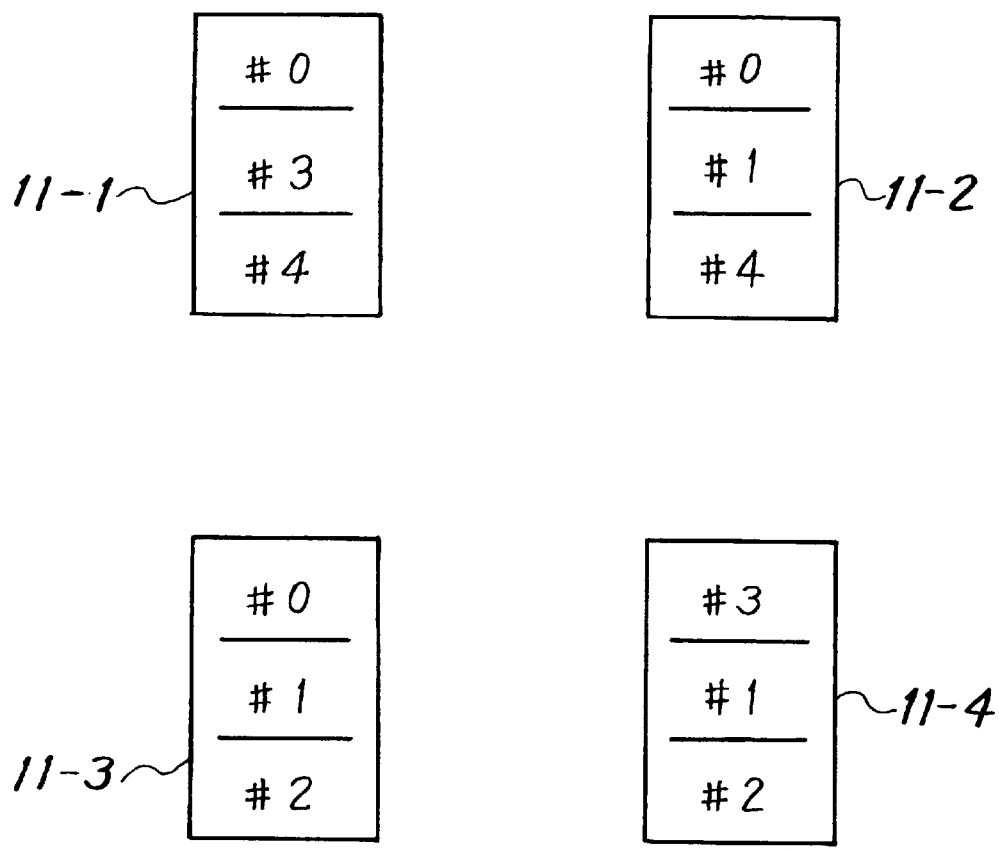
FIG. 16 is an explanatory diagram of the sixth embodiment of this invention.
Figure 17:
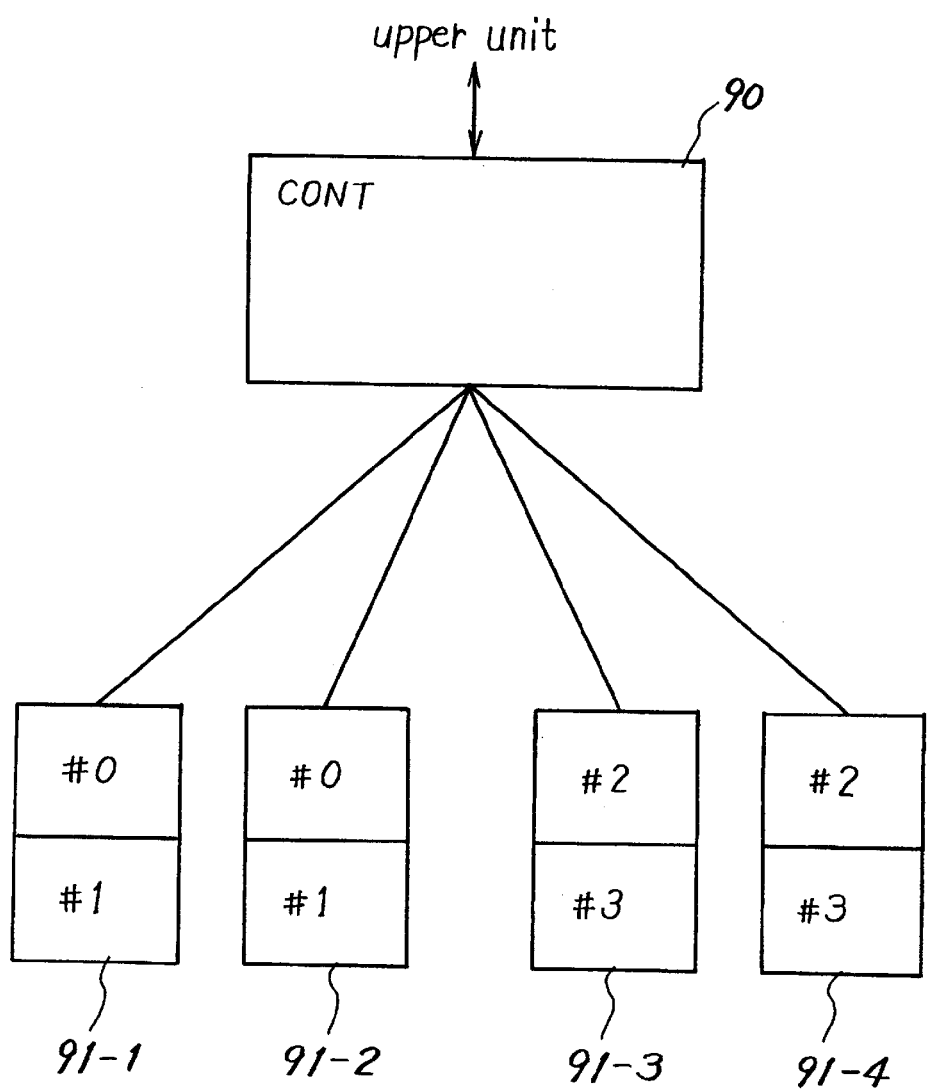
FIG. 17 is a structural diagram of prior art.
Figure 18A:
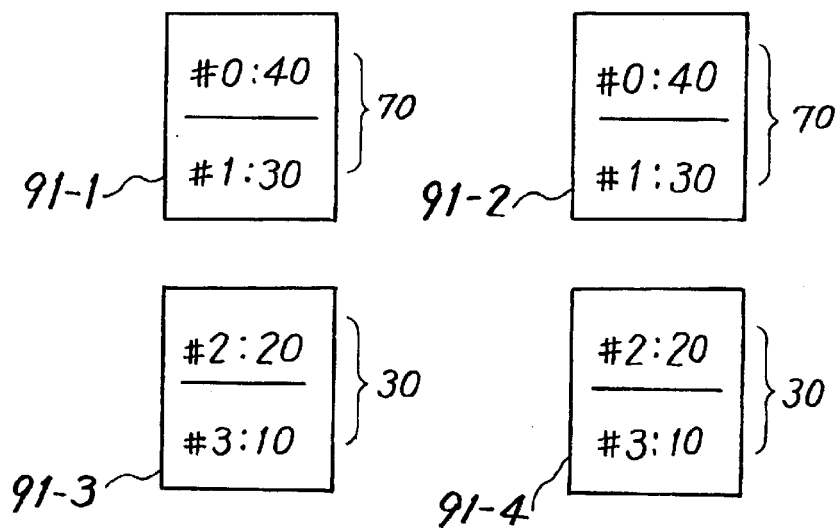
FIGS. 18A and 18B are explanatory diagrams (part 1) of conventional problems.
Figure 18B:
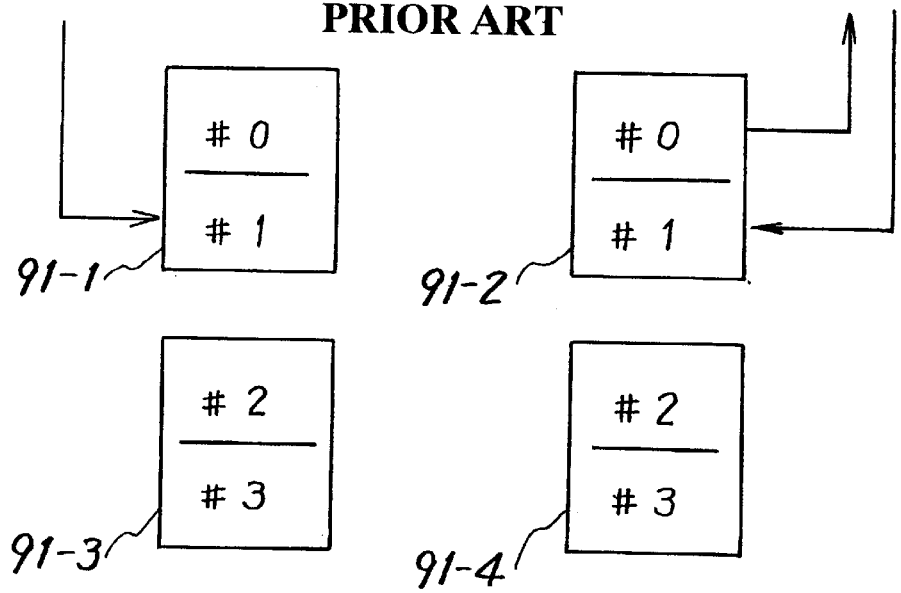
Figure 19:
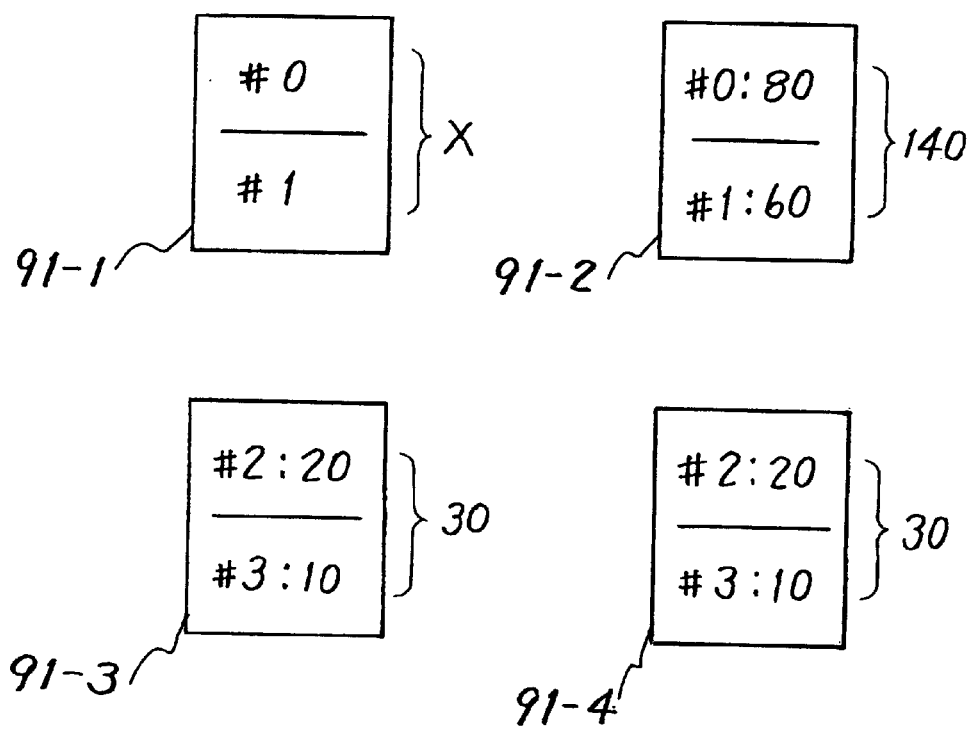
FIG. 19 is an explanatory diagram (part 2) of conventional problems.

FIG. 16 is an explanatory diagram of the sixth embodiment of this invention.

FIG. 16 shows the case of m=3 and n=2. Specifically, three logical volumes are allocated on a single physical disk unit and two pairs of physical disk units are provided in this example. As shown in FIG. 16, the combinations of logical volumes #0 to #4 allocated on the individual physical disk units 11-1 to 11-4 differ from one physical disk unit to another.

The logical volumes allocated on the same physical disk unit on the primary side are allocated different physical disk units on the secondary side. Further, the logical volumes #0 and #1 are provided triple and the logical volumes #2 and #3 are provided double.

As apparent from the above, the multiplicity of each logical volume can be selected in accordance with the frequency of accesses.

Besides the above-described embodiments, this invention may be modified as follows.

(1) Although the foregoing description has been given of the RAID-1 or the mirror structure which has double logical volumes, this invention may be adapted to the structure which has logical volumes provided triple.

(2) Although the physical disk units have been explained as magnetic disk units, optical disk units, magneto-optical disk units or the like may be used as well.

Although several embodiments of this invention have been described herein, various other modifications can be made within the scope and spirit of this invention, and the present examples and embodiment are to be considered as illustrative and not restrictive.

As apparent from the above, this invention has the following advantages.

(1) As the combination of logical volumes to be allocated differs from one physical disk unit to another, even if loads are not evenly put on the logical volumes, loading on the physical disk units is adjusted. It is therefore possible to prevent uneven loading on the physical disk units from occurring due to uneven loads on the logical volumes.

(2) Due to the difference in the combinations of the logical volumes to be allocated between the physical disk units, it is possible to prevent contention of access to logical volumes which are undergoing a process of making a copy between logical volumes.

(3) Because of the difference in the combinations of the logical volumes to be allocated between the physical disk units, loads are distributed to the whole physical disk units even in retreat mode to thereby prevent over-concentration of loads.

What is claimed is:

1. A RAID apparatus comprising:

a real volume including a plurality of physical disk units onto each of which a plurality of logical volumes that are arranged in mirror structure are allocated; and a disk controller receiving an access request from a host that recognizes a logical volume as one volume and accessing any of the physical disk units on which a logical volume designated by said access request is allocated in order to access said designated logical volume, wherein said real volume comprises a plurality of same logical volumes respectively allocated to different physical disk units and a combination of a plurality of logical volumes is allocated to each physical disk unit, said combination differing from one physical disk unit to another, and wherein said disk controller includes a conversion table indicating a plurality of physical disk units on which said logical volumes are allocated for said logical volumes, a number indicating the location of the real volume where the designated logical volume is allocated, a counter representing the quantity of designated logical volume, and information indicating whether said associated physical disk unit is invalid;

and said disk controller selects a valid physical disk unit on which said designated logical volume is allocated by referring to said conversion table and wherein said RAID apparatus performs load adjustment over the physical disk units by equalizing loads on the physical disk units, wherein plural logical volumes of the plurality of logical volumes are allocated to a single physical disk unit, and wherein said disk controller refers to said conversion table in response to said access request, searches said conversion table determining said physical disk unit being unused and valid, on which a logical volume designated by said access request is allocated and accessing said physical disk unit to access said designated logical volume.

2. A RAID apparatus comprising:

a real volume including a plurality of physical disk units onto each of which a plurality of logical volumes that are arranged in mirror structure are allocated; and a disk controller receiving an access request from a host that recognizes a logical volume as one volume and accessing any of the physical disk units on which a logical volume designated by said access request is allocated in order to access said designated logical volume, wherein said real volume comprises a plurality of same logical volumes respectively allocated to different physical disk units and a combination of a plurality of logical volumes is allocated to each physical disk unit, said combination differing from one physical disk unit to another, wherein said disk controller includes a conversion table indicating a plurality of physical disk units on which said logical volumes are allocated for said logical volumes, a number indicating the location of the real volume where the designated logical volume is allocated, a counter representing the quantity of designated logical volume, and a use table for storing information indicative of that physical disk unit being in use for each of said physical disk units;

and said disk controller selects an unused one of a plurality of physical disk units where said designated logical volume is allocated by referring to said conversion table and use table in response to said access request and wherein said RAID apparatus performs load adjustment over the plurality of physical disk units by equalizing loads on the plurality of physical disk units, wherein plural logical volumes of the plurality of logical volumes are allocated to the single physical disk unit.

3. A RAID accessing method comprising:

receiving an access request from a host that recognizes a logical volume as one volume; and accessing any of physical disk units on which a logical volume designated by said access request is allocated in order to access said designated logical volume, wherein said physical disk units each asymmetrically store a different combination of logical volumes that are arranged in mirror structure, than each of the other physical disk units to perform load adjustment by equalizing loads over the plurality of physical disk units for said access of said logical volume unit of said host, wherein plural logical volumes of the plurality of logical volumes are allocated to a single physical disk unit; and wherein accessing comprises:

referring to a conversion table, for said logical volumes, in response to said access request, indicating a plurality of physical disk units on which said logical volumes are allocated, a number indicating the location of the real volume where the designated logical volume is allocated, and a counter representing the quantity of designated logical volume;

searching said conversion table to determine said physical disk unit being unused and valid, and on which a logical volume designated by said access request is allocated; and accessing said physical disk unit to access said designated logical volume.

4. The RAID apparatus according to claim 3, wherein the number of same logical volumes allocated on said real volume differs among said logical volumes.

5. The RAID apparatus according to claim 3, wherein said disk controller includes said conversion table, for each of said logical volumes, for holding information indicating a plurality of physical disk units on which said logical volumes are allocated, and information indicating the number of said allocated same logical volumes; and said disk controller selects a physical disk unit on which said designated logical volume is allocated by referring to said conversion table.

6. A RAID apparatus comprising:

a real volume including a plurality of physical disk units onto each of which a plurality of logical volumes that are arranged in mirror structure are asymmetrically allocated; and a disk controller receiving an access request from a host that recognizes a logical volume as one volume and accessing any of the physical disk units on which a logical volume designated by said access request is allocated to access said designated logical volume, wherein said real volume comprises a plurality of same logical volumes respectively allocated to different physical disk units and a combination of a plurality of logical volumes is allocated to each physical disk unit, said combination differing from one physical disk unit to another, and wherein said disk controller includes a conversion table, for said logical volumes, indicating a plurality of physical disk units on which said logical volumes are allocated, a number indicating the location of the real volume where the designated logical volume is allocated and, a counter representing the quantity of designated logical volume; and said disk controller refers to said conversion table in response to said access request, searches said conversion table determining said physical disk unit being unused and on which a logical volume designated by said access request is allocated, and accessing said physical disk unit to access said designated logical volume.

7. The RAID apparatus according to claim 6, wherein said conversion table further includes a counter representing the multiplicity of said logical volume, and said disk controller refers to said conversion table according to said counter.

* * * * *

UNITED STATES PATENT AND TRADEMARK OFFICE
CERTIFICATE OF CORRECTION

PATENT NO. : 6,799,245 B1
DATED : September 28, 2004
INVENTOR(S) : Toshiaki Kochiya et al.

It is certified that error appears in the above-identified patent and that said Letters Patent is hereby corrected as shown below:

Title page,
Item [54], Title, change "SOME" to -- SAME --;
Item [56], References Cited, OTHER PUBLICATIONS, "*The RAIDBOOK*" reference, change "RSID Adivsory" to -- RAID Advisory --;

Column 5,
Line 49, insert -- designated --;
Line 51, delete "designated by said access request".

Signed and Sealed this

Twenty-sixth Day of April, 2005

JON W. DUDAS
*Director of the United States Patent and Trademark Office*